United States Patent
Parker et al.

(10) Patent No.: US 6,851,904 B2
(45) Date of Patent: Feb. 8, 2005

(54) SELF-ATTACHING FEMALE FASTENER AND METHOD OF INSTALLATION

(75) Inventors: John M. Parker, Ann Arbor, MI (US); Kerry V. Boggs, South Lyon, MI (US)

(73) Assignee: FabriSteel Products, Inc., Taylor, MI (US)

( * ) Notice: Subject to any disclaimer, the term of this patent is extended or adjusted under 35 U.S.C. 154(b) by 0 days.

(21) Appl. No.: 10/232,335

(22) Filed: Aug. 30, 2002

(65) Prior Publication Data

US 2004/0042870 A1 Mar. 4, 2004

(51) Int. Cl.$^7$ ................................................. F16B 37/04
(52) U.S. Cl. ....................................... 411/180; 411/188
(58) Field of Search ................................. 411/179, 180, 411/184, 187, 188, 107; 29/432.2, 515, 521, 522

(56) References Cited

U.S. PATENT DOCUMENTS

| | | | |
|---|---|---|---|
| 1,332,686 A | * | 3/1920 | Reynolds |
| 1,919,552 A | | 7/1933 | Hasselquist |
| 3,000,420 A | * | 9/1961 | Spokes |
| 3,133,579 A | * | 5/1964 | Grimm |
| 3,213,914 A | | 10/1965 | Baumle et al. .......... 151/41.72 |
| 3,253,631 A | | 5/1966 | Reusser ................... 151/41.73 |
| 3,282,315 A | | 11/1966 | Zahodiakin .............. 151/41.73 |
| 3,282,317 A | * | 11/1966 | Zahodiakin |
| 3,736,969 A | | 6/1973 | Warn et al. .............. 151/41.73 |
| 3,810,291 A | | 5/1974 | Ladouceur ............... 29/243.52 |
| 3,878,599 A | * | 4/1975 | Ladouceur |
| 3,910,331 A | | 10/1975 | Randall ................... 151/41.72 |
| 4,389,766 A | | 6/1983 | Capuano .................. 29/432.2 |
| 4,432,681 A | | 2/1984 | Capuano .................... 411/180 |
| 4,543,023 A | | 9/1985 | Capuano .................... 411/180 |
| 4,627,776 A | | 12/1986 | Pamer et al. ............... 411/179 |
| 4,637,766 A | | 1/1987 | Milliser ..................... 411/180 |
| 4,708,556 A | | 11/1987 | Pamer et al. ............... 411/179 |
| 4,810,143 A | | 3/1989 | Muller ...................... 411/181 |

(List continued on next page.)

FOREIGN PATENT DOCUMENTS

EP 0864766 A1 9/1998

OTHER PUBLICATIONS

RIMS Brochure (German).
RIMS Brochure (English).

*Primary Examiner*—Flemming Saether
(74) *Attorney, Agent, or Firm*—Howard & Howard

(57) ABSTRACT

A self-attaching nut having an annular pilot, an annular flange surrounding the pilot and an annular groove in the bearing surface surrounding the pilot, wherein the bottom wall of the groove has inclined rectangular protuberances and the outer wall of the groove has radial channel-shaped grooves spaced between the radial protuberances. During installation, panel metal is driven against the inclined radial protuberances, driving panel metal under the inclined outer wall of the groove and into the radial grooves in the flange.

15 Claims, 3 Drawing Sheets

U.S. PATENT DOCUMENTS

| | | | |
|---|---|---|---|
| 4,831,698 A | 5/1989 | Muller | 29/512 |
| 4,893,976 A | 1/1990 | Milliser et al. | 411/180 |
| 4,911,592 A | 3/1990 | Muller | 411/181 |
| 5,244,326 A | 9/1993 | Henriksen | 411/366 |
| 5,251,370 A | 10/1993 | Muller et al. | 29/512 |
| 5,302,066 A | 4/1994 | Bieschke et al. | 411/181 |
| 5,335,411 A | 8/1994 | Muller et al. | 29/512 |
| 5,340,251 A | 8/1994 | Takahashi et al. | 411/179 |
| 5,423,645 A | 6/1995 | Muller et al. | 411/181 |
| 5,509,766 A | 4/1996 | Leuschner | 411/187 |
| 5,531,552 A | 7/1996 | Takahashi et al. | 411/179 |
| 5,549,430 A | 8/1996 | Takahashi et al. | 411/179 |
| 5,613,815 A | 3/1997 | Müller | 411/181 |
| 5,782,594 A | 7/1998 | Muller | 411/176 |
| 5,882,159 A | 3/1999 | Müller | 411/179 |
| 6,004,087 A | 12/1999 | Müller | 411/180 |
| 6,081,994 A | 7/2000 | Müller | 29/798 |
| 6,220,804 B1 | 4/2001 | Pamer et al. | 411/180 |
| 6,257,814 B1 | 7/2001 | Müller | 411/176 |
| 6,276,040 B1 | 8/2001 | Müller | 29/432.2 |
| D457,054 S | 5/2002 | Pamer et al. | D8/397 |
| 6,409,444 B2 | 6/2002 | Pamer et al. | 411/180 |
| 6,543,979 B2 | 4/2003 | Iwatsuki | 411/180 |
| 2001/0010789 A1 | 8/2001 | Pamer et al. | 411/179 |
| 2002/0159858 A1 | 10/2002 | Ikami et al. | 411/181 |
| 2002/0172573 A1 | 11/2002 | Pamer et al. | 411/337 |
| 2002/0182032 A1 | 12/2002 | Anderson et al. | 411/533 |

* cited by examiner

SELF-ATTACHING FEMALE FASTENER AND METHOD OF INSTALLATION

FIELD OF THE INVENTION

The present invention relates to self-attaching female fastener elements, particularly including pierce nuts, which may be formed by conventional cold header techniques and which provide improved retention and resistance to rotation of the fastener on a panel following installation.

BACKGROUND OF THE INVENTION

Self-attaching female fasteners, including pierce nuts, generally include a central projecting pilot portion having a planar end face, a bore extending through the end face which may be threaded or unthreaded, flange portions on at least opposed sides of the pilot portion each having a planar bearing face spaced below the plane of the end face of the pilot portion, and grooves in the bearing face of the flange portion or in the sides of the pilot portion which receive the panel and retains the self-attaching female fastener element on the panel.

Self-attaching female fastener elements of the type described above may be formed by either rolling a metal wire into the desired shape, cutting the wire to the desired length and piercing a bore, wherein the fastener is rectangular, or formed by cold header techniques, wherein the nut is generally annular or cylindrical, and the flange portion and the groove surround the pilot portion. The self-attaching female fastener elements formed by each of these methods has certain advantages. For example, a rectangular pierce nut formed by rolling generally has superior retention, including push-off strength and resistance to rotation in the panel compared to a round or cylindrical nut formed by cold heading. However, rolling techniques used for manufacturing self-piercing nuts require a rolling mill, expensive equipment and know how. Further, a pierce nut having a rectangular pilot may form stress risers in the panel adjacent the corners of the pilot during installation. A self-attaching nut, particularly a pierce nut, formed by conventional cold header techniques is less expensive to manufacture, but generally has less structural integrity in the joint, particularly including torque resistance or resistance to rotation of the nut in the panel after installation. It is therefore a primary object of this invention to provide a self-attaching female fastener element, particularly including a pierce nut, which may be formed by conventional cold header techniques, and which provides improved structural integrity when installed in a panel, including improved push-off strength and resistance to rotation of the nut on a panel compared to conventional pierce nuts formed by cold heading techniques.

U.S. Pat. No. 5,531,552, assigned to the predecessor in interest of the assignee of this application, discloses a self-attaching female fastener element, which may be utilized as a pierce nut, formed by conventional cold header techniques. However, pierce nuts formed by the method disclosed in this patent when installed in a panel do not have sufficient structural integrity for many applications, particularly including relatively thin metal panels as used by the automotive and appliance industries. It is therefore a further object of this invention to improve the push-off strength and torque resistance of the fastener disclosed in this patent.

SUMMARY OF THE INVENTION

The self-attaching female fastener element of this invention may be formed by conventional cold header techniques and may be utilized as a pierce nut and provides superior integrity in a fastener and panel assembly formed by the method of this invention including improved push-off strength and resistance to rotation in the panel or torque resistance. The self-attaching female fastener element of this invention includes an annular pilot portion having a bore extending through an annular end face of the pilot portion, an annular flange portion surrounding the pilot portion preferably having a planar annular bearing face generally parallel to and spaced below the plane of the end face of the pilot portion, an annular groove in the annular bearing face of the flange portion surrounding the pilot portion including an annular bottom wall, an inner side wall adjacent the pilot portion and an outer side wall inclined from the bottom wall toward the pilot portion defining a restricted or "re-entrant" opening of the annular groove adjacent the bearing face. In a preferred embodiment, the inner side wall of the annular groove is also inclined outwardly from the bottom wall of the groove toward the flange portion providing improved push-off strength.

The bottom wall of the groove of the self-attaching fastener element of this invention includes a plurality of circumferentially spaced radial protrusions projecting from the bottom wall of the groove which, in a preferred embodiment, are inclined radially from adjacent the inner side wall to the outer side wall of the annular groove. The radial protrusions, particularly when inclined radially outwardly, drive panel metal beneath the inclined outer side wall of the groove providing improved push-off strength and torque resistance. In a preferred embodiment, the radial protrusions project from the bottom wall of the groove and include side walls extending generally perpendicular to the bottom wall of the groove and panel metal is deformed around the radial protrusions against the side walls of the protrusions providing resistance to turning of the female fastener element in the panel. In a preferred embodiment, wherein the radial protrusions are inclined, the radial protrusions preferably extend from the inner side wall to the outer side wall of the annular groove, such that the side walls of the protrusions are triangular, providing the greatest torque resistance adjacent the outer side wall of the groove, thereby providing maximum torque resistance.

A preferred embodiment of the self-attaching female fastener of this invention further includes circumferentially spaced radial grooves in the outer side wall of the annular groove, preferably equally spaced between the radial protrusions of the bottom wall. In a preferred embodiment, the radial grooves in the outer side wall of the annular groove are channel-shaped having an outer wall extending from the annular bearing face of the flange portion to the bottom wall of the annular groove. In a preferred embodiment, the outer wall of the radial grooves is also inclined inwardly toward the pilot portion and parallel to the outer wall of the annular groove. In a preferred embodiment, the circumferential width of the outer wall of the radial groove is equal to or greater than twice the circumferential width of the radial protrusions projecting from the bottom wall of the annular groove. During installation of the self-attaching female fastener, panel metal is driven against the bottom wall of the annular groove and radially into the radial grooves, whereby the radial grooves provide both improved torque resistance and push-off strength, particularly in thin metal applications as used by the automotive and appliance industries. In another preferred embodiment, the outer wall of the pilot portion includes radial grooves which preferably extend into the end face of the pilot portion, but are spaced from the bottom wall of the annular groove which provides additional torque resistance, particularly in thicker panel metal applications.

The method of attaching a pierce nut of this invention includes driving the end face of the pilot portion against a metal panel, thereby piercing an opening through the metal panel and receiving the pilot portion through the opening in the panel. The method then includes driving an annular portion of the panel surrounding the opening against the annular bottom wall of the annular groove and against the inclined radial protrusions projecting from the bottom wall of the annular groove. The inclined radial protrusions then drive the annular portion of the panel radially beneath the inclined outer side wall of the annular groove, securely retaining the self-piercing nut on the panel and circumferentially around the inclined radial protrusions, preventing rotation of the pierce nut on the panel. In a preferred embodiment of the self-piercing nut of this invention which includes the radial grooves in the outer wall of the annular groove, the annular panel portion is deformed against the radial protrusions is also deformed radially into the radial grooves in the outer wall of the annular groove and preferably beneath the inclined portion of the outer wall of the radial grooves, providing improved push-off strength.

The self-attaching female fastener element of this invention achieves the objects of this invention and may be formed by conventional header techniques. Other objects and meritorious features of the self-attaching female fastener element and method of this invention will be more fully understood from the following description of the preferred embodiments, the appended claims and the drawings, a brief description of which follows.

DESCRIPTION OF THE PREFERRED EMBODIMENTS

Figure 1:
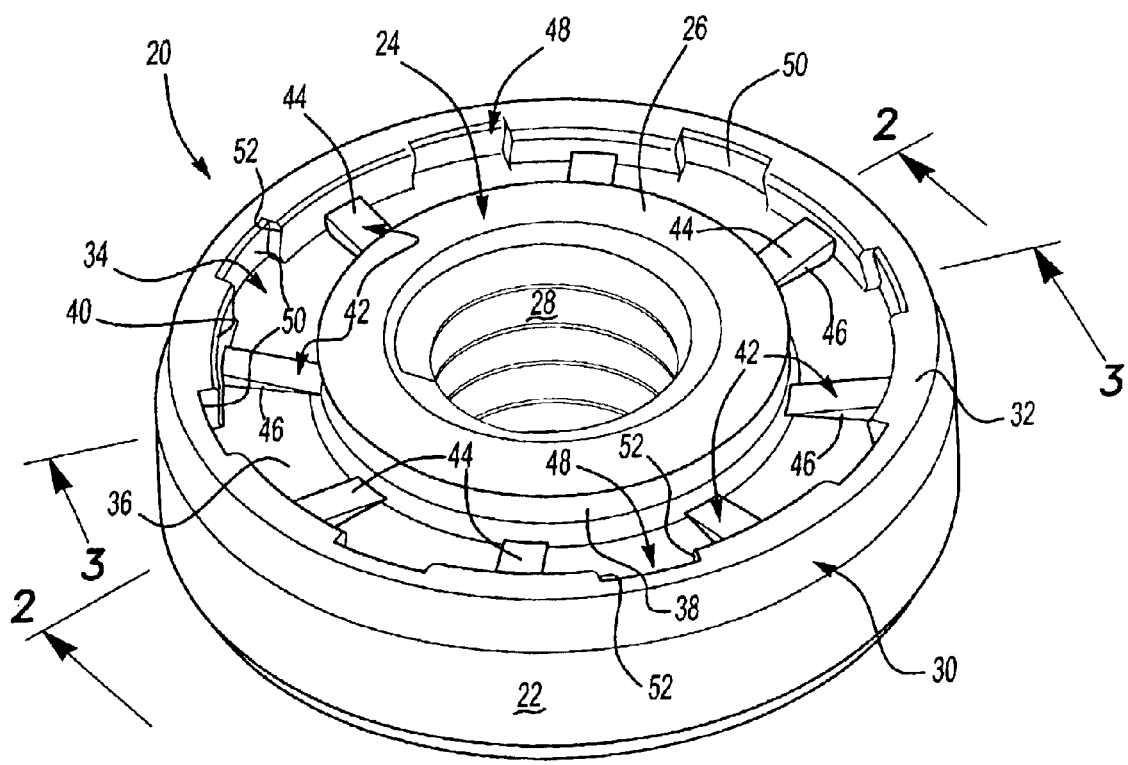
FIG. 1 is a top plan view of one embodiment of the self-attaching female fastener element of this invention.
Figure 2:
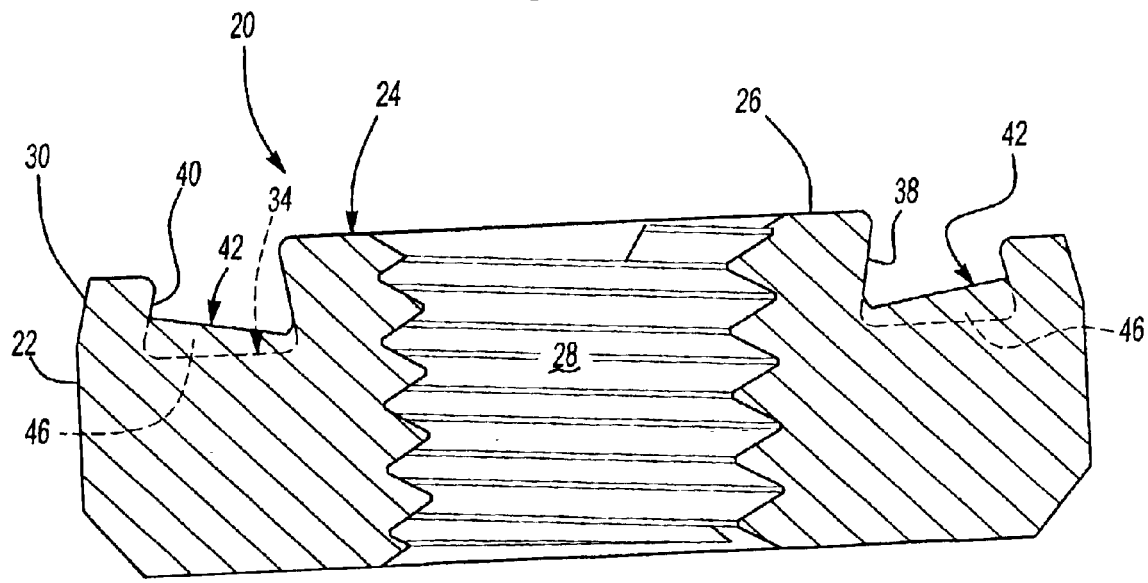
FIG. 2 is a cross-sectional view of FIG. 1 in the direction of view arrows 2—2.
Figure 3:
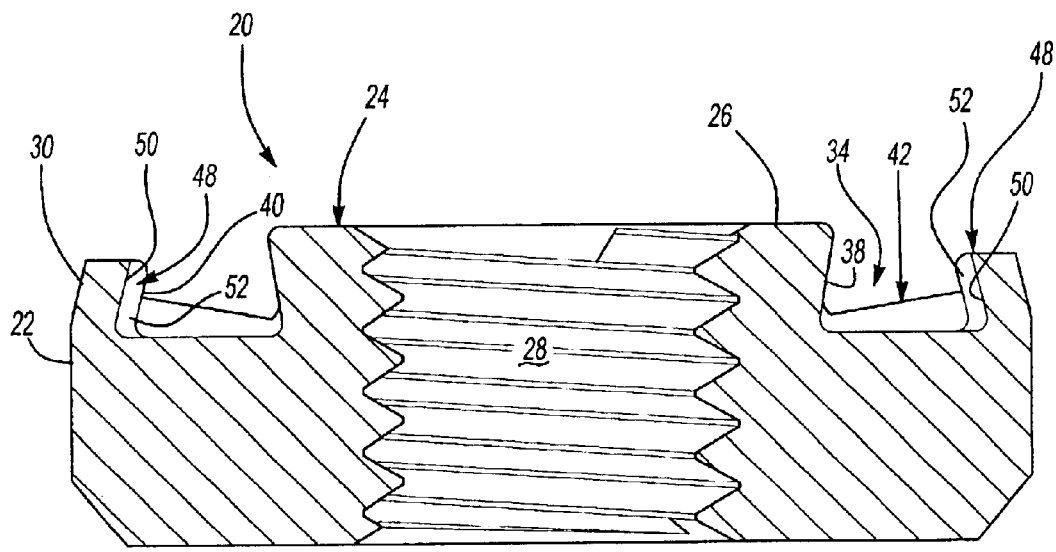
FIG. 3 is a cross-sectional view of FIG. 1 in the direction of view arrows 3—3.

As set forth above, the self-attaching female fastener element of this invention may be utilized as a pierce nut, wherein the pierce nut has improved integrity when installed in a panel, and may be formed by conventional cold header techniques. As shown in FIGS. 1 to 3, the self-attaching nut 20 of this embodiment of the invention includes a generally cylindrical body portion 22, including an annular pilot portion 24 having a planar end face including a bore 28, which may be threaded as shown. Alternatively, the bore 28 may be unthreaded for receipt of a thread forming or thread rolling bolt or male fastener (not shown). The self-attaching nut 20 further includes an annular flange portion 30 surrounding the pilot portion 24 having a planar bearing face 32 parallel to, but spaced below the plane of the end face 26 of the pilot portion. An annular groove 34 is defined in the bearing face 32 having a bottom wall 36, an inner side wall 38 and an outer side wall 40. As best shown in FIGS. 2 and 3, the outer side wall 40 of the annular groove 34 is preferably inclined radially inwardly toward the pilot portion 24 to improve retention of a metal panel deformed into the groove as further discussed below in regard to the method of this invention and the description of FIG. 4. Where the self-attaching nut is used as a pierce nut, particularly when attached to relatively thin metal, the inner side wall 38 is also inclined outwardly toward the flange portion 30, as best shown in FIGS. 2 and 3. Where only one of the side walls is inclined, the preferred embodiment includes an inclined outer side wall 40. Where one or both side walls are inclined, the entrance to the annular groove 34 is restricted, providing improved push-off strength of the nut in the nut and panel assembly. However, where the self-attaching pierce nut of this invention is utilized for thin metal applications, the greatest push-off strength is provided by inclining both the inner and outer side walls 38 and 40, as shown.

The self-attaching nut 20 shown in FIGS. 1 to 3 further includes a plurality of radial protuberances 42 integral with and projecting from the bottom wall 36 of the annular groove 34 which, in a preferred embodiment, are inclined radially outwardly from the inner side wall 38 of the annular groove to the outer side wall 40. In this disclosed embodiment, the radial protuberances 42 each include a generally rectangular upper face 44 and triangular side faces 46. The angle of inclination is preferably between 5 and 15 degrees or about 10 degrees. As described below, the inclined radial protuberances 42 drive panel metal beneath the inclined outer side wall 40 of the annular groove 34 improving retention of the nut on the panel and increasing the torque resistance. The disclosed embodiment of the self-attaching nut 20 further includes circumferentially spaced radial grooves 48 in the outer side wall 40 of the annular groove. In a preferred embodiment, the radial grooves 48 are generally channel-shaped each having an outer or bottom face 50 and opposed radial side faces 52. In a preferred embodiment, the radial grooves 48 extend into the planar bearing face 32 of the annular flange portion 30 and extend from the bearing face 32 to the bottom wall 36 of the groove, as shown. Further, the radial grooves 48 are equally spaced between the radial protuberances 42 and the circumferential width of the outer face 50 of the radial grooves is at least equal to twice the circumferential width of the rectangular face 44 of the radial protuberances 42. As used herein, the term "circumferential width" of the radial grooves 48 is measured between the radial side faces 52 and the "circumferential width" of the radial protuberances 42 is measured between the triangular side faces 46. As best shown in FIG. 3, the radial outer face 50 of the radial grooves 48 is also inclined outwardly toward the pilot portion 24 or parallel to the outer side wall 40 of the annular groove 34 providing additional push-off strength for the nut and panel assembly. As shown in FIG. 1, however, the radial grooves 48 are generally rectangular particularly in plan view.

Figure 4:
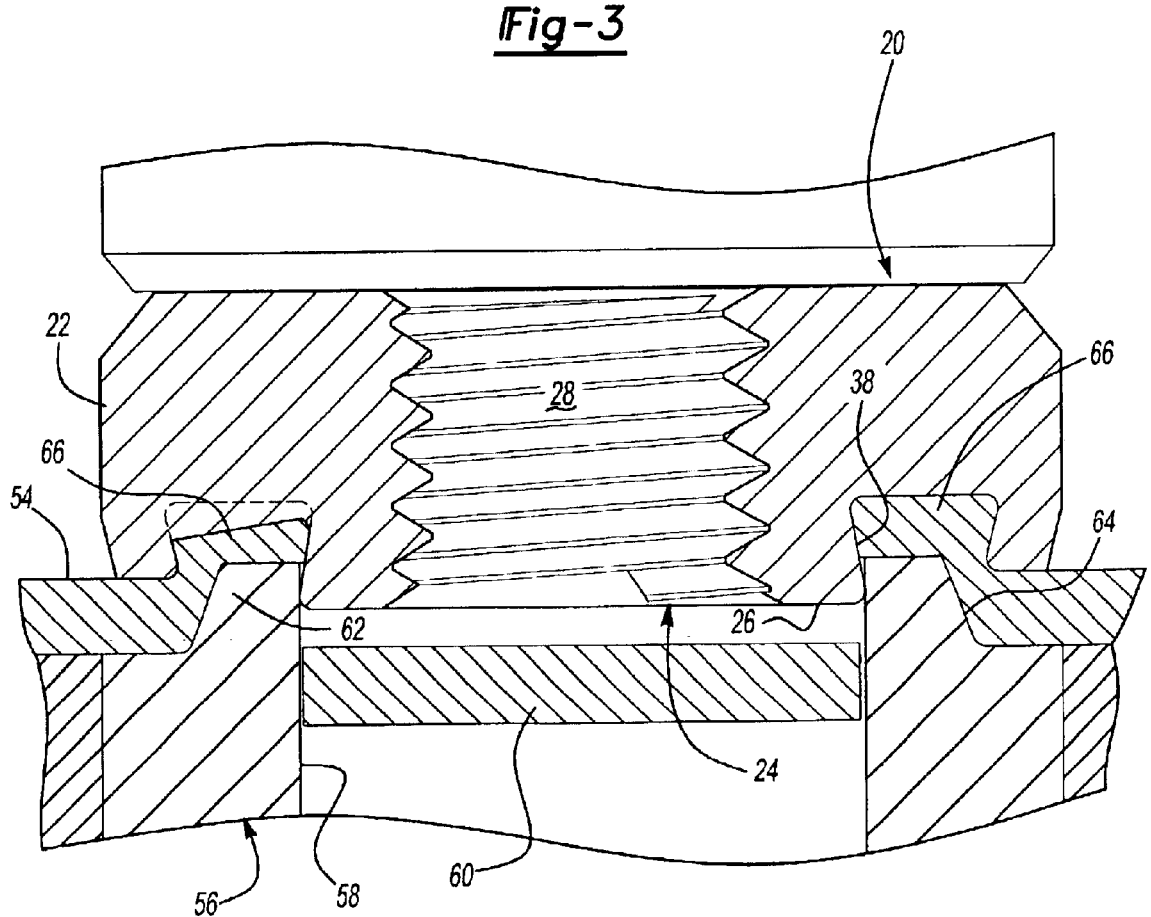
FIG. 4 is a partially cross-sectioned view of the self-attaching female fastener element illustrated in FIG. 1 installed in a metal panel.

FIG. 4 illustrates a method of attaching the self-attaching nut 20 shown in FIGS. 1 to 3. As shown in FIG. 4, the self-attaching nut 20 is utilized as a self-piercing female fastener or pierce nut and installed in a panel 54 by a die member 56 commonly referred to as a "die button." The die button 56 is generally cylindrical having a cylindrical opening 58 which receives the panel slug 60 during installation and an annular generally cylindrical projecting lip 62 which deforms panel metal 66 surrounding the pierced panel opening into the annular groove 34 as now described. The panel 54 may be supported by any suitable means on the die button 56, such that the annular lip 62 is coaxially aligned with the annular groove 34 of the pierce nut 20. As will be understood by those skilled in this art, the die button 56 is conventionally retained in the lower die platen of a die press (not shown) and the pierce nut 20 is received in an installation head located in the upper die platen (not shown) as is well known in this art. However, the orientation may be reversed. As the end face 26 of the pilot portion 24 of the pierce nut 20 is driven against the panel 54, the panel 54 is pierced between the outer edge of the end face 26 of the pilot portion 24 and the inside surface of the annular lip 62, piercing a slug 60 from the panel. The annular lip 62 of the die button 56 which, in the disclosed embodiment, includes a frustoconical outer surface 64, drives the panel metal 66 adjacent the pierce panel opening into the annular groove 34 and against the bottom wall 36 including the radial protuberances 42. As the end face of the annular lip 62 is driven against the panel 66 and the inclined radial protuberances 42, the panel metal is then driven radially outwardly beneath the inclined outer side wall 40 of the annular groove 34, providing improved push-off strength, and into the radial grooves 48 and providing improved torque resistance as discussed further below. The method of attaching a self-piercing nut of this invention then includes piercing an opening through panel 54, receiving the pilot portion 24 through the pierced panel opening, driving the panel metal 66 surrounding the pierce panel opening against the bottom wall 36 and the inclined radial protuberances 42, driving panel metal radially outwardly against the inclined outer side wall 40 and into the radial grooves 48. Panel metal is also driven radially into the radial grooves 48 beneath the inclined outer or bottom face 50 of the radial grooves, providing additional push-off strength.

Figure 5:
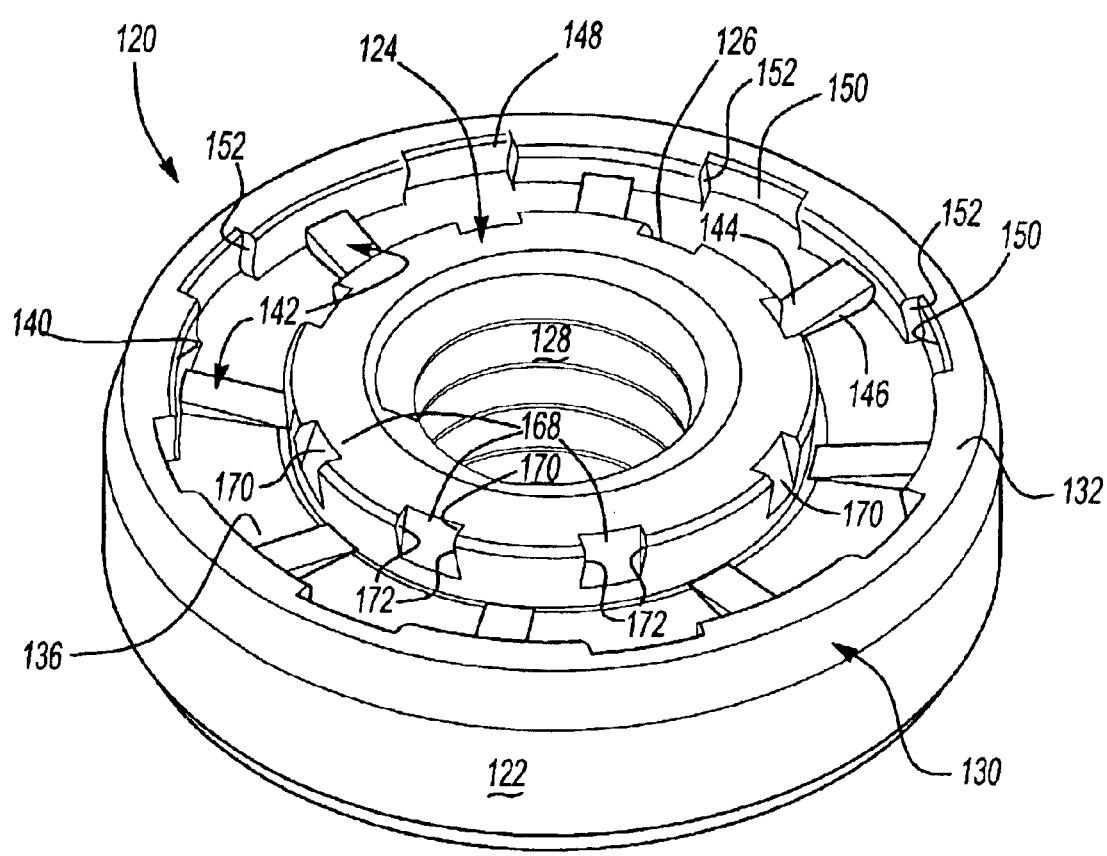
FIG. 5 is a perspective view of an alternative embodiment of the self-attaching female fastener element of this invention.

FIG. 5 illustrates an alternative embodiment of the self-attaching nut 120 which may be identical to the nut 20 illustrated in FIGS. 1 to 3, except that the pilot portion 124 includes spaced radial grooves 168 which, in the disclosed embodiment, are channel-shaped having an inner wall 170 and radial side walls 172 radially aligned with the radial grooves 148 in the outer wall 140 of the annular groove 134. Because all of the other features of the self-attaching nut 120 may be identical to the self-attaching nut 20 described above and the reference numbers of FIG. 5 are the same as FIGS. 1 to 3, except that 100 has been added to the reference numbers of FIGS. 1 to 3, no detailed description of FIG. 5 is required. The radial grooves 168 in the inner side wall 138 extend into the end face 126 of the pilot portion 124 in the disclosed embodiment, but are spaced from the bottom wall 136, as shown. The radial grooves 168 provide additional resistance to turning of the self-attaching nut 120 particularly when installed in a thicker panel, because panel metal is driven into the radial grooves 168 during installation.

The pierce nut 20 illustrated in FIGS. 1 to 3 and the method of installation illustrated in FIG. 4 was tested by the applicant and compared to an installation of the pierce nut illustrated in the above-referenced U.S. Pat. No. 5,531,552. Three important advantages were found with the pierce nut 20 illustrated in FIGS. 1 to 3, including (1) improved torque resistance or resistance to turning of the nut on a panel following installation, (2) improved nut retention or push-off strength, and (3) the nut 20 shown in FIGS. 1 to 3 can be installed in a greater range of panel thicknesses than the pierce nut in the referenced patent. For example, an M6 nut as shown in FIGS. 1 to 3 had an average nut retention (push-off strength) of 2.11 kN in 0.75 mm panel, compared to 1.44 kN for the nut shown in the referenced patent. The root or major diameter of the threaded bore of an M6 nut is 6 mm. The nut retention of an M6 nut in 1.25 mm panel of the nut shown in FIGS. 1 to 3 had an average retention of 4.54 kN, compared to 3.89 kN for the nut shown in the referenced patent; however, the threaded nut bore of the nut of the referenced patent was deformed during installation which is not acceptable. The nut retention for an M6 nut as shown in FIGS. 1 to 3 in a panel having a thickness of 1.8 mm was 6.62 kN, compared to 3.00 kN of a nut shown in the referenced patent. However, the nut shown in the referenced patent also had thread distortion and the panel slug (60 in FIG. 4) remained attached to the panel which is also unacceptable. A pierce nut as shown in FIGS. 1 to 3 was installed in a panel having a thickness of 2.30 mm and the nut retention was 6.04 kN. However, a nut in accordance with the referenced patent could not be installed in a panel having a thickness of 2.30 mm. Similar advantages were found for torque resistance, wherein a nut as shown in FIGS. 1 to 3 was installed in a panel having a thickness of 0.75 mm had a torque resistance was 20.80 Nm, compared to a nut as shown in the referenced patent having a torque resistance of 11.67 Nm. As set forth above, a nut in accordance with the referenced patent installed in a panel having a thickness of 1.25 mm resulted in thread distortion, a nut in accordance with the referenced patent installed in a panel having a thickness of 1.80 mm resulted in both thread distortion and slug retention and could not be installed in a panel having a thickness of 2.30 mm.

The torque resistance of a nut as shown in FIGS. 1 to 3 installed in a 1.25 mm panel had a torque resistance of 24.8 Nm, 25.50 Nm installed in a panel having a thickness of 1.80 mm and 23.80 mm installed in a panel having a thickness of 2.30 mm. Even greater improvements were found installing an M8 nut as shown in FIGS. 1 to 3 compared to an M8 pierce nut of the referenced patent. The average nut retention and torque resistance was more than double for the pierce nut shown in FIGS. 1 to 3 than the pierce nut shown in the referenced patent in panels having a thickness of 0.75 mm and 1.25 mm and the pierce nut shown in the referenced patent had thread distortion when installed in a panel having 1.80 mm and could not be installed in a panel having a thickness of 2.30 mm. Thus, the self-attaching nut and method of this invention has significant advantages over the prior art based upon the tests conducted by the applicant.

As will be understood, various modifications may be made to the self-attaching female fastener element and method of this invention within the purview of the appended claims. For example, as set forth above, the inner wall of the annular groove may be cylindrical, although in the preferred embodiment, the inner wall is inclined radially outwardly from the bottom wall, as described above. It may also be possible to eliminate the radial grooves on the outer wall of the groove and grooves on the pilot as shown in FIG. 5 are optional.

What is claimed is:

1. A self-attaching female fastener, comprising:

an annular pilot portion having a bore extending through an annular planar end face of said pilot portion;

an annular flange portion surrounding said pilot portion having a generally planar annular bearing face generally parallel to a plane of said annular planar end face of amid pilot portion;

an annular groove in said planar annular bearing face of said flange portion surrounding said pilot portion including an annular bottom wall, an inner aide wall and an outer side wall, one of said inner and outer side walls of said annular groove inclined toward the other of said inner and outer side walls defining a restricted opening at said annular bearing face of said flange portion;

a plurality of circumferentially spaced radial protrusions projecting from said bottom wall and integral with one of said inner and outer side walls of said annular groove each having a planar radial top face inclined toward said bottom wall; and a plurality of circumferentially spaced channel-shaped recesses in said outer wall of said annular groove spaced between said circumferentially spaced radial protrusions.

2. The self-attaching female fastener as defined in claim 1, wherein said plurality of circumferentially spaced channel-shaped radial recesses each include a planar outer end wall inclined radially inwardly from said bottom wall toward said pilot portion.

3. The self-attaching female fastener as defined in claim 1, wherein said circumferentially spaced radial protrusions each include side faces extending perpendicular to said bottom wall.

4. The self-attaching female fastener as defined in claim 1, wherein each of said plurality of circumferentially spaced channel-shaped recesses has a circumferential width at least twice a circumferential width of said radial protrusions.

5. The self-attaching female fastener as defined in claim 1, wherein said inner wall of said annular groove includes a plurality of circumferentially spaced channel-shaped radial recesses.

6. The self-attaching female fastener as defined in claim 5, wherein said circumferentially spaced channel-shaped radial recesses in said inner wall of said annular groove extend from said annular end face of said pilot portion but are spaced from said bottom wall of said annular groove.

7. A self-attaching female fastener, comprising:

an annular pilot portion having a bore extending through an annular planar end face of said pilot portion;

an annular flange portion surrounding said pilot portion having a generally planar annular bearing face generally parallel to a plane of said annular planar end face of said pilot portion;

an annular groove in said generally planar annular bearing face of said annular flange portion surrounding said annular pilot portion including a planar annular bottom wall extending generally perpendicular to an axis of said bore, an inner side wall and an outer sidewall, one of said inner and outer side walls of said annular groove inclined toward the other of said inner and outer side walls defining a restricted opening at said annular bearing face of said flange portion;

a plurality of circumferentially spaced radial protrusions projecting from said bottom wall integral with one of said inner and outer side walls of said annular groove, each having a radial top face and opposed radial side faces generally perpendicular to said bottom wall; and a plurality of circumferentially spaced channel-shaped recesses in said outer sidewall of said annular groove circumferentially spaced between said radial protrusions.

8. The self-attaching female fastener as defined in claim 7, wherein said plurality of circumferentially spaced channel-shaped recesses in said outer wall of said annular groove are spaced between said circumferentially spaced radial protrusions.

9. The self-attaching female fastener as defined in claim 7, wherein said plurality of circumferentially spaced channel-shaped radial recesses, each include a planar outer end wall inclined radially inwardly from said bottom wall toward said pilot portion.

10. The self-attaching female fastener as defined in claim 7, wherein each of said plurality of circumferentially spaced channel-shaped recesses has a circumferential width at least twice a circumferential width of said radial protrusions.

11. The self-attaching female fastener as defined in claim 7, wherein said inner wall of said annular groove includes a plurality circumferentially spaced channel-shaped radial recesses, each having a planar inner wall in an outer wall of said pilot portion spaced from said bottom wall of said annular groove.

12. A self-attaching female fastener, comprising:

an annular pilot portion having a bore extending through an annular planar end face of said pilot portion;

an annular flange portion surrounding said pilot portion having a generally planar annular bearing face generally parallel to a plane of said annular planar end face of said pilot portion;

an annular groove in said generally planar annular bearing face of said annular flange portion surrounding said pilot portion, including a bottom wall, an inner side wall and an outer side wall, one of said inner and outer side walls of said annular groove inclined toward the other of said inner and outer side walls defining a restricted opening at said annular bearing face of said flange portion;

a plurality of circumferentially spaced radial protrusions projecting from said bottom wall and integral with one of said inner and outer side walls of said annular groove, each having a planar radial top face spaced above a plane of said bottom wall and opposed radial side faces extending generally perpendicular to said bottom wall; and a plurality of circumferentially spaced channel-shaped recesses in said outer wall of said annular groove, each having a circumferential width greater than twice a circumferential width of said radial planar top face of said radial protrusions.

13. The a self-attaching female fastener as defined in claim 12, wherein said channel-shaped radial recesses in said outer wall of said annular groove are spaced between circumferentially spaced radial protrusions.

14. The self-attaching female fastener as defined in claim 12, wherein said plurality of circumferentially spaced channel-shaped radial recesses include a generally planar outer end wall inclined radially inwardly from said bottom wall toward said pilot portion.

15. The self-attaching female fastener as defined in claim 12, wherein said inner wall of said annular groove includes a plurality of circumferentially spaced channel-shaped radial recesses.

\* \* \* \* \*

UNITED STATES PATENT AND TRADEMARK OFFICE
CERTIFICATE OF CORRECTION

PATENT NO.    : 6,851,904 B2                                              Page 1 of 1
DATED         : February 8, 2005
INVENTOR(S)   : John M. Parker and Kerry V. Boggs It is certified that error appears in the above-identified patent and that said Letters Patent is hereby corrected as shown below:

<u>Column 6,</u>
Line 59, please delete "amid" and insert -- said --.
Line 62, please delete "aide" and insert -- side --.

<u>Column 7,</u>
Lines 43 and 54, please change the word "sidewall" to -- side wall --.

<u>Column 8,</u>
Line 14, please insert the word -- of -- after the word "plurality."
Line 45, please delete the word "a" after the word "The."

Signed and Sealed this

Seventeenth Day of May, 2005

JON W. DUDAS
*Director of the United States Patent and Trademark Office*